United States Patent
Riesselmann et al.

(10) Patent No.: US 6,279,614 B1
(45) Date of Patent: Aug. 28, 2001

(54) MULTI-LAYER PLASTIC TUBE

(75) Inventors: Franz-Josef Riesselmann, Lohne; Harald Eichner, Ochtrup; Josef Bruenen, Wettringen; Paul Wolters, Ochtrup; Nils Wehmeier, Osnabrueck, all of (DE)

(73) Assignee: Hewing GmbH, Ochtrup (DE)

( * ) Notice: Subject to any disclaimer, the term of this patent is extended or adjusted under 35 U.S.C. 154(b) by 0 days.

(21) Appl. No.: 09/402,110

(22) PCT Filed: Mar. 27, 1998

(86) PCT No.: PCT/EP98/01822
§ 371 Date: Sep. 29, 1999
§ 102(e) Date: Sep. 29, 1999

(87) PCT Pub. No.: WO98/43806
PCT Pub. Date: Oct. 8, 1998

(30) Foreign Application Priority Data

Mar. 29, 1997 (DE) .......................................... 297 05 681 U

(51) Int. Cl.[7] .................................................... F16L 11/11
(52) U.S. Cl. .......................... 138/137; 138/122; 138/141; 138/DIG. 1
(58) Field of Search .................................. 138/114, 121, 138/122, 137, 141, DIG. 1

(56) References Cited

U.S. PATENT DOCUMENTS

| | | | |
|---|---|---|---|
| 4,101,699 | * | 7/1978 | Stine et al. ........................... 138/141 |
| 4,299,256 | | 11/1981 | Bacehowski et al. . |
| 4,470,171 | * | 9/1984 | Rusmussen et al. ............... 138/118.1 |
| 4,643,927 | * | 2/1987 | Luecke et al. ....................... 138/141 |
| 4,892,442 | * | 1/1990 | Shoffner ............................... 138/137 |
| 4,944,972 | * | 7/1990 | Blemberg ............................. 138/137 |
| 4,948,643 | * | 8/1990 | Mueller ................................ 138/137 |
| 5,380,385 | * | 1/1995 | Derroire et al. ..................... 138/137 |
| 5,488,975 | * | 2/1996 | Chiles et al. ........................ 138/137 |
| 5,634,498 | * | 6/1997 | Nishida . |
| 5,639,528 | * | 6/1997 | Feit et al. ............................. 138/126 |
| 5,858,492 | * | 1/1999 | Roeber et al. .................... 428/36.91 |

FOREIGN PATENT DOCUMENTS

| | | |
|---|---|---|
| 8104908 | 2/1981 | (DE) . |
| 3903436 | 7/1990 | (DE) . |
| 4216516 | 11/1993 | (DE) . |
| 296 06 533 U | 7/1996 | (DE) . |
| 0637509 | 2/1995 | (EP) . |

OTHER PUBLICATIONS

Database WPI; Section Ch, Week 8133; Derwent Publications Ltd., London, GB; Class A17, AN 81–59804D, Jul. 1981.

Database WPI; Section Ch, Week 9822; Derwent Publications Ltd., London GB; Class A17; AN 98–245065 Mar. 1998.

\* cited by examiner

Primary Examiner—James Hook
(74) Attorney, Agent, or Firm—Birch, Stewart, Kolasch & Birch, LLP

(57) ABSTRACT

A multi-layer plastic tube comprises a base tube and a barrier layer surrounding the base tube, the barrier layer being impermeable to oxygen, and a protective layer applied on the barrier layer for protecting the barrier layer from damage, wherein the material of the barrier layer and protective layers may include a lubricant.

13 Claims, 1 Drawing Sheet

MULTI-LAYER PLASTIC TUBE

Figure 1:
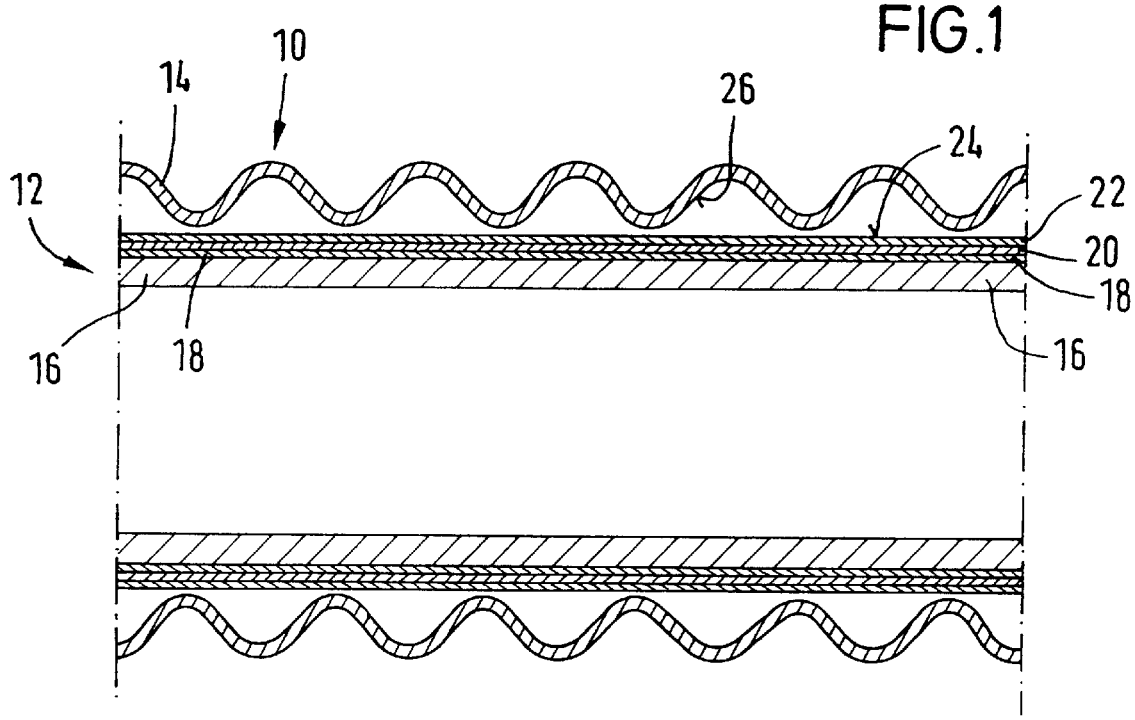

The invention relates to a multi-layer plastic tube which can be used for conducting gases and/or fluids and is particularly suited as a drinking-water, sanitary-water or heating tube.

In the field of sanitary and heating installations, use is made not only of metal pipes but also of plastic tubes made e.g. from polyethylene (PE). The plastic materials used in such tubes are permeable to oxygen and therefore will usually be provided with a (oxygen) diffusion barrier layer which normally surrounds the fluid-conducting base tube on the outside.

In practice, EVOH (ethylene-vinyl-alcohol) has proven useful as a material for said barrier layer. The drier this material is, the better it is able to fulfill its function as a diffusion barrier. Unfavorably, EVOH becomes more brittle with increasing dryness. Since an increasing brittleness is accompanied by reduced electricity, this in turn leads to a risk of fossilization and cracking and of a crumbling of the material of the barrier layer. This danger exists particularly if the plastic tube is exposed to changes in its length which are caused by variations of the temperature of the fluid in the tube.

To protect the mostly brittle diffusion barrier layer from damage, DE 296 06 533 U1 discloses a multi-layer plastic tube wherein the barrier layer is surrounded by a protective layer. As a material of this barrier layer, preferred use is made of PE. The material of the protective layer is softer than the material of the barrier layer, which, while offering the advantage of mechanical protecting the barrier layer, also entails the disadvantage that the outer surface of the plastic tube is comparatively dull. This disadvantage is particularly aggravating if the plastic tube is shifted into empty tubes which are mostly formed as corrugated tubes. Such "tube-within-a-tube" conduits are often prefabricated by the manufacturer, with plastic tubes of an overall length of several tens of meters being inserted into corrugated tubes. Due to the dull outer surface of the plastic tubes, this insertion requires relatively large forces. The process involves the risk that the drive elements of the advance means for the insertion of the plastic tube into the corrugated tube will rub against the plastic tube, possibly heating the plastic tube and thus damaging the protective layer thereof. Further, during the automatic prefabrication process at the manufacturing site, a sliding of the drive elements of the advance means on the plastic tube disadvantageously prevents that the exact preset length of plastic tube is reliably inserted into the corrugated tube.

From DE-U-81 04 908, a plastic tube is known which comprises a base tube of cross-linked PE, an oxygen diffusion barrier layer from EVOH and an outer layer of a linear PE. Also such a tube causes relatively large frictional forces while inserted into a corrugated tube or a similar encasing tube.

From U.S. Pat. No. 4,299,256, it is known to admix silicone oil to the PVC outer layer of a plastic tube so as to reduce the friction on the outer surface of the tube.

To sum up, with regard to PEX tubes applied on an adhesive layer and an EVOH layer thereon, with the layer thicknesses of these outer layers being each about 100 $\mu$m, the following difficulties arise:

Due to the varying bending stresses in the curve regions of the laid tubes, fissures may be generated as a result of the brittleness. This can lead to a detachment of the EVOH layer and a propagation of the fissures and in the worst case may result in breakage of the tube.

The oxygen barrier property of the EVOH layer material is considerably dependent on the humidity in the environment of the tube. Notably, with increased humidity absorption of the EVOH material, its barrier property will decrease correspondingly.

When connecting a tube to a connecting means, improper handling can cause damage to edges of the connecting means.

Further, certain connecting techniques require the tube to be widened. This type of connection technology finds increasing acceptance on the market since it is performed easily and at low production costs. However, when widening a plastic tube provided with an EVOH barrier layer, a danger exists that the EVOH layer might tear because its expansion behavior cannot be reproduced with sufficient reliability.

It is an object of the invention to provide a multi-layer plastic tube having an oxygen diffusion barrier layer which is protected against mechanical damage, with the plastic tube being suited for insertion into an outer tube in a relatively simple manner and without excessive application of force.

According to the instant invention, the above object is solved by a multi-layer plastic tube comprising a base tube, a barrier layer surrounding the base tube and being impermeable to oxygen, and a protective layer applied on the barrier layer for protecting the barrier layer from damage, wherein the material of the barrier layer includes a lubricant.

According to the invention, the material of the protective layer has a lubricant admixed thereto which, mixed with the rest of the material of the protective layer, is applied onto the barrier layer by extrusion. During the solidifying of the material of the protective layer and in the solidified condition, the lubricant migrates to the surface of the protective layer and becomes active there, i.e. it lends its sliding properties to the multi-layer plastic tube. Thus, the lubricant is particularly a material on the basis of oleic-acid amide/erucic-acid amide. Alternatively, use can be made of materials on the basis of silicone oil or tetrafluoroethylene.

Due to the addition of a lubricant to the material of the protective layer which is preferably a material on PE-basis, the multi-layer plastic tube of the invention—in addition to the mechanical protective function of the barrier layer—is given sliding properties which facilitate the insertion of the multi-layer plastic tube into an empty tube. The combination of a plastic material and a lubricant material in the manufacture of plastic items is known e.g. from slidable films in the packaging industry. Surprisingly, it has been found that the lubricants added in the packaging industry can be used, substantially in the same concentrations, also for protective layers of plastic tubes. This could not have been expected as a matter of course because the manufacturing processes of films and plastic tubes are noticeably different from each other, and especially because plastic tubes have a substantially larger surface relative to the material volume used than is the case with plastic tubes.

The term "lubricant" in the context of the invention is meant to include also a lubricant in the form of a so-called antiblock agent which, by changing the surface structure, allows two items to rub against each other in a smooth manner. Such antiblock agents are known e.g. from the production and processing of plastic films.

Preferably, the base tube is arranged in an outer tube which is spaced from the outer protective layer of the base tube. The outer tube is made of plastic and particularly is formed as a corrugated tube.

By way of alternative, further according to the invention, a variant of the above described embodiment of the multi-layer plastic tube comprises a base tube, a barrier layer surrounding the base tube and being impermeable to oxygen, and a protective layer applied on the barrier layer for protecting the barrier layer from damage, and an outer tube having the base tube arranged therein and surrounding the protective layer of the base tube with a clearance, wherein the inner side of the outer tube is provided with a lubricant.

According to this variant of the invention, the lubricant is arranged on the inner side of an outer tube which is suitably provided as a corrugated tube. In this case, the lubricant can be included in the material of the outer tube. If the lubricant is a material on the basis of oleic-acid amide/erucic-acid amide, the material migrates to the inner side of the outer tube where it will fulfill its sliding function when the base tube with its dull outer protective layer is inserted into the outer tube.

In the two above mentioned variants, depending on the material selected for the barrier layer, it is of advantage if an adhesive layer comprising an adhesive is arranged between the barrier layer and the base tube. Preferably, the material of the adhesive is a modified linear LDPE.

A further variant of the invention relates to a multi-layer plastic tube comprising a base tube of PE, particularly of cross-linked PE, an adhesive layer comprising an adhesive and surrounding the base tube, a barrier layer surrounding the adhesive layer and being impermeable to oxygen, and a protective layer of EVOH applied on the barrier layer for protecting the barrier layer from damage, the adhesive comprising a modified linear LDPE material of a density below 926 kg/m$^3$, the protective layer comprising a modified linear LDPE material of a density larger than 928 kg/m$^3$, and the modifications of the two linear LDPE materials being selected such that the adhesion of the protective layer to the EVOH barrier layer is larger than the adhesion of the EVOH barrier layer to the adhesive layer.

In this variant of the invention, the barrier layer is formed of EVOH while the adhesive and the protective layer respectively comprise differently modified linear materials. The modifications are selected such that the adhesion of the protective layer to the EVOH barrier layer is larger than the adhesion to the adhesive layer and thus to the base tube. Particularly, the density of the linear LDPE material of the adhesive layer is below 926 kg/m$^3$ and larger than 916 kg/m$^3$. Preferably, the density of the modified linear LDPE material of the protective layer is larger than 928 kg/m$^3$ and below 940 kg/m$^3$.

As has been found out, the above selection of the material for the protective layer is advantageous in that the protective layer on the one hand is strong enough to protect the underlying brittle EVOH barrier layer from mechanical damage and on the other hand is hard enough to lend sufficient sliding properties to the tube. Thus, the protective layer has sliding properties, i.e. in this regard is wholly made of a material having such a property, i.e. the modified linear LDPE material.

Further, as an advantageous modification of all variants of the invention, it is provided that the barrier layer is arranged outside the neutral zone of the multi-layer plastic tube, i.e. off the center of the extension of the wall thickness of the multi-layer plastic tube.

All of the components of the multi-layer plastic tube of the invention are extruded, wherein the extruded base tube is first provided with the barrier layer by extrusion, and the protective layer is then extruded onto the barrier layer.

Preferably, the layer thickness of the adhesive is between 10 $\mu$m and 70 $\mu$m. The thickness of the protective layer should not be below 40 $\mu$m and thus is preferably between 40 $\mu$m and 100 $\mu$m.

Using the above described sequence of layers comprising the adhesive layer, the barrier layer and the protective layer around the base tube, it is accomplished that a possible fissure generated in the barrier layer will more or less "peter out" and thus cannot anymore attack the base tube arranged under the adhesive layer. The reason for this phenomenon of the "petering out" of a fissure is the use of an adhesive on the basis of a linear LDPE having the above mentioned density, with the thickness of this adhesive layer being suitably between 10 and 70 $\mu$m.

Surprisingly, the thickness of the protective layer influences the overall properties of the multi-layer plastic tube. The protective layer should not be thinner than 40 $\mu$m.

Basically, the protective layer should be made of a relatively tough material, thus allowing to make optimum use of its protective function for the barrier layer. Thus, a linear LDPE would actually seem useful as a material for the protective layer. However, the tube surrounded with such a protective layer would become relatively dull and thus could not be inserted by the desired lengths e.g. into a corrugated tube or the like outer tube. Further, a protective layer of a relatively tough material would generate a relatively soft surface throughout the tube, which in turn would cause deformations particularly when winding up the tube. This would give rise to phenomena such as flattened regions on the outer surface. This would have a negative influence on the optical quality of the tube, possibly accompanied by disadvantages during the assembly with respect to the requirement of a tight connection of e.g. a connecting element externally on the tube.

According to the invention, the problem of a relatively high frictional resistance can be solved by adding a lubricant, while the problem of a risk of deformation is acted against by the use of high-density plastic materials on the basis of metallocene. The overall combination of the compositions of the materials of the three layers wound around the base tube, i.e. of the adhesive layer, the EVOH barrier layer and the protective layer, offers the following properties:

good adhesion of the EVOH layer, considerable toughness of the material forming the outer surface of the tube, high resistance against the propagation of fissures, high stiffness of the material forming the outer surface of the tube to avoid deformation, good sliding properties to allow insertion of the tube by the respective desired lengths into outer tubes, particularly corrugated tubes.

Figure 2:
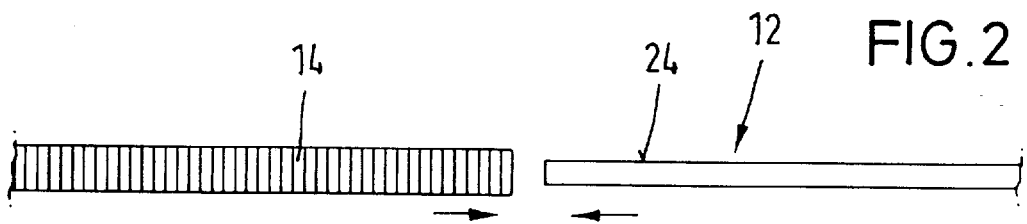
Figure 3:
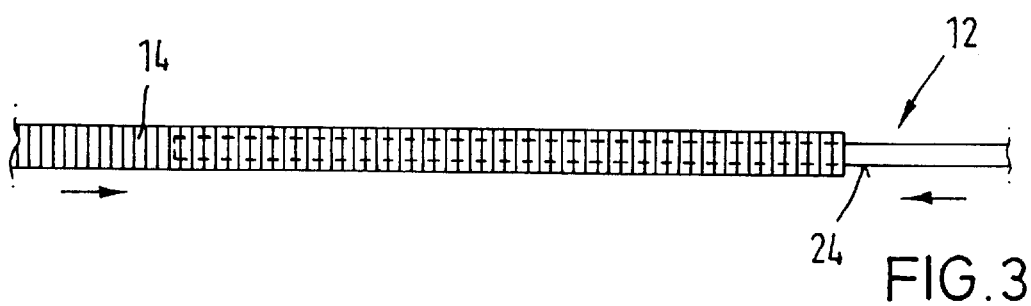

Two preferred embodiments of the invention will be explained in greater detail hereunder with reference to the drawings, wherein FIG. 1 is a longitudinal sectional view of a tube-within-tube combination comprising a gas-or fluid-conducting inner tube and an outer corrugated tube, and FIGS. 2 and 3 are systematic illustrations of the method steps for the—e.g. automatic—insertion of the inner tube into the outer tube.

FIG. 1 shows a sectional view of a tube-within-tube combination 10 comprising an inner tube 12 and a corrugated outer tube 14. The inner tube 12 comprises a base tube 16 of PE having an adhesive layer 18, like-wise on PE basis, applied thereon. A relatively brittle EVOH barrier layer 20 is applied to the outer surface of adhesive layer 18. For protecting the EVOH barrier layer 20, this layer is surrounded by a protective layer 22 made from a relatively tough material and comprising e.g. the material of adhesive layer 18. The material of protective layer 22 has a lubricant of oleic-acid amide basis added thereto. Thus, in spite of the protective layer 22 which is relatively tough and dull in comparison with the EVOH barrier layer, the inner tube 12 is given extraordinarily good sliding properties. Also the outer tube 14 provided as a corrugated tube comprises polyethylene.

Due to its good sliding properties, the plastic inner tube 12 of the above configuration can be prefabricated as a tube-within-tube combination 10 with considerable lengths. The frictional resistance of the outer surface 24 of inner tube 12 and the inner surface 26 of corrugated tube 14 is reduced so that, when shifting the two tubes into each other according to FIGS. 2 and 3, considerably smaller forces are required than in a case where the material of the protective layer 22 has no lubricant admixed thereto.

Thus, using the above described inner tube 12, there is provided a multi-layer plastic tube which in spite of the provision of a mechanical protective layer for the oxygen-diffusion barrier layer 20 has good sliding properties.

On the basis of the order of layers of the multi-layer inner tube 12 as described with reference to FIG. 1, this tube was produced using the following composition of materials. For the base tube 16, a crosslinked PE material was used. The adhesive layer 18 was extruded onto base tube 16. The material used for the adhesive layer 18 was a modified linear LDPE material. This material was applied in a layer thickness of 10 $\mu$m to 70 $\mu$m, particularly 50 $\mu$m. Subsequently, the EVOH barrier layer 20 was extruded onto adhesive layer 18. The thickness of the EVOH barrier layer 20 was 50 $\mu$ to 100 $\mu$m. Then, a modified linear LDPE material was extruded onto the EVOH barrier layer 20 as a protective layer 22, notably in a thickness of at least 40 $\mu$m and particularly 100 $\mu$m at the most.

The modification of the LDPE material of base tube 16 was selected such that the adhesion of base tube 16 to barrier layer 20 was set in a controlled manner but not in an optimal manner. On the other hand, the modification of the LDPE material of protective layer 22 was selected to have the protective layer 22 attached to the EVOH barrier layer 20 with large adhesion. The density of the LDPE material of protective layer 22 was higher than the density of the LDPE material of base tube 16. Particularly, the density of the LDPE material of base tube 16 was between 918 and 924 kg/m$^3$ while the density of the LDPE material of protective layer 22 was between 929 and 936 kg/m$^3$. In addition to the good connection between the individual layers of inner tube 12, the selection of the material for protective layer 22 offered, on the one hand, a good mechanical protection of the brittle barrier layer 20 with sufficiently high resistance against surface deformation and, on the other hand, good sliding properties of inner tube 12 so that the latter could be shifted into the outer plastic corrugated tube 14 without high frictional forces disturbing this manufacturing process for tube-within-tube conduit systems.

What is claimed is:

1. A multi-layer plastic tube comprising:
   a base tube,
   a barrier layer surrounding the base tube, said barrier layer being impermeable to oxygen, and including a lubricant, and
   a protective layer applied on the barrier layer for protecting the barrier layer from damage, the material of the protective layer being an adhesive having a lubricant added thereto.

2. The multi-layer plastic tube according to claim 1, wherein the lubricant comprises oleic-acid amide, erucic-acid amide, silicone oil or tetrafluoroethylene.

3. The multi-layer plastic tube according to claim 1, wherein an adhesive layer is arranged between the base tube and the barrier layer.

4. The multi-layer plastic tube according to claim 1, wherein an adhesive layer is arranged between the base tube and the barrier layer.

5. The multi-layer plastic tube according to claim 1, wherein the barrier layer is arranged off a center of the extension of a wall thickness between the inner side of the base tube and an outer side of the protective layer.

6. The multi-layer plastic tube according to claim 1, wherein all of the base tube, the barrier layer and the protective layer are extruded.

7. The multi-layer plastic tube according to claim 1, wherein the base tube is arranged in an outer tube surrounding the protective layer of the base tube with a clearance.

8. The multi-layer plastic tube according to claim 1, wherein the protective layer comprises metallocene.

9. A multi-layer plastic tube including,
   a base tube of cross-linked PE,
   an adhesive layer surrounding the base tube,
   a barrier layer surrounding the adhesive layer, said barrier layer being impermeable to oxygen, and
   a protective layer applied on the barrier layer for protecting the barrier layer from damage, the improvement comprising:
   the protective layer including a modified linear LDPE material of a density below 926 kg/m$^3$, and
   the protective layer including a modified linear LDPE material of a density larger than 928 kg/m$^3$,
   the modifications of the two linear LDPE materials being selected such that the adhesion of the protective layer to the EVOH barrier layer is larger than the adhesion of the EVOH barrier layer to the adhesive layer.

10. The multi-layer plastic tube according to claim 9, wherein the density of the linear LDPE material of the adhesive layer is between 916 and 927 kg/m$^3$.

11. The multi-layer plastic tube according to claim 9, wherein the density of the linear LDPE material of the protective layer is between 927 and 940 kg/m$^3$.

12. The multi-layer plastic tube according to claim 9, wherein the thickness of the adhesive layer is between 10 $\mu$m and 70 $\mu$m.

13. The multi-layer plastic tube according to claim 9, wherein the thickness of the protective layer is between 40 $\mu$m and 100 $\mu$m.

* * * * *